Aug. 29, 1933.   E. DESSAU   1,924,110
METHOD OF PRODUCING AND REPRODUCING FILMS FOR THE REPRODUCTION OF
PICTURE FILMS IN COMBINATION WITH SOUND FILMS (TALKING FILMS)
Filed Sept. 19, 1928
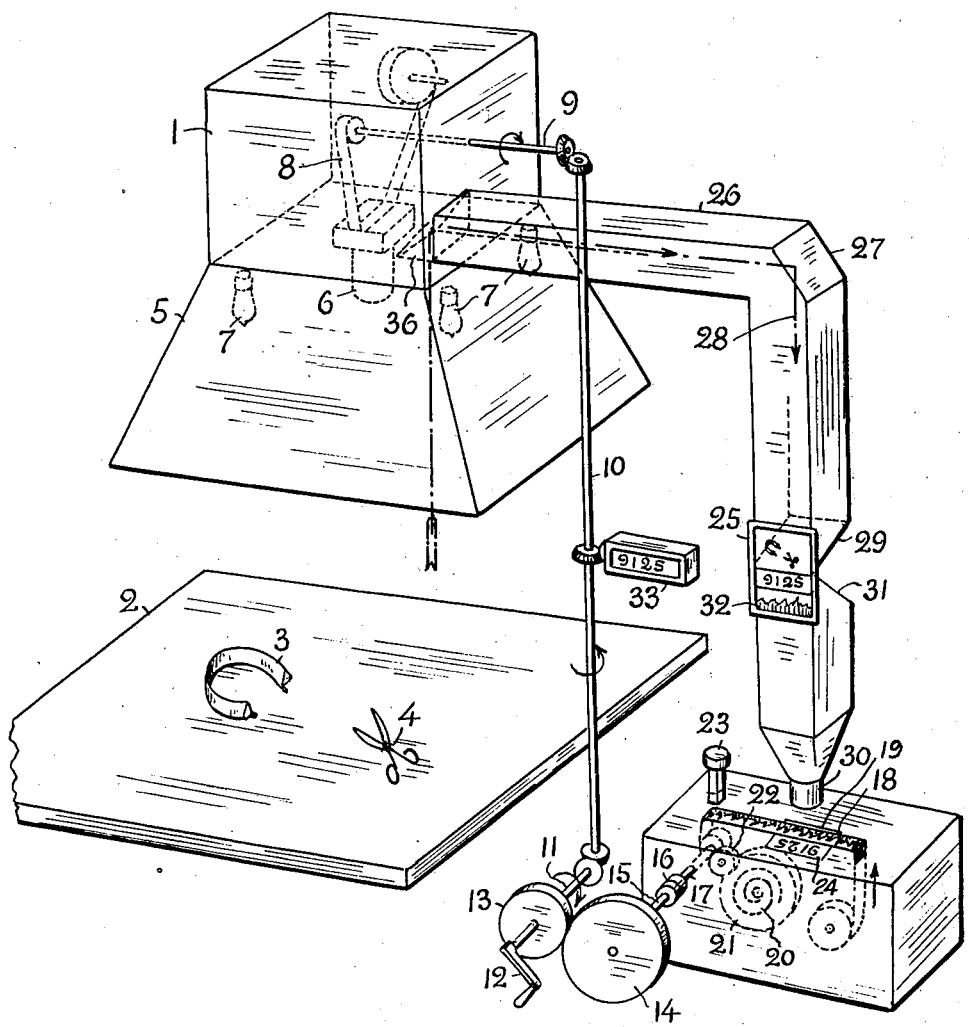
EINAR DESSAU
INVENTOR
BY Otto Munk
HIS ATTY.

Patented Aug. 29, 1933

1,924,110

UNITED STATES PATENT OFFICE 1,924,110

METHOD OF PRODUCING AND REPRODUCING FILMS FOR THE REPRODUCTION OF PICTURE FILMS IN COMBINATION WITH SOUND FILMS (TALKING FILMS)

Einar Dessau, Copenhagen, Denmark

Application September 19, 1928, Serial No. 306,897, and in Germany June 17, 1927

1 Claim. (Cl. 88—16.2)

Films at present generally used for the reproduction of moving pictures accompanied by sounds corresponding to the pictures, that is, the so-called talking films, consist of an integral film or of a strip formed by two single strips, or rather a double strip, one strip of which is a customary picture strip or film, while the other is a special strip which may be called a sound strip or film. These sound films are made in several ways, as for example, by electrically transferring the sound waves corresponding to the events appearing on the picture strip to a mirror, so that the latter oscillates in accordance with the sound waves and reflects the light on to a film strip so that a series of light lines of different length and frequency are recorded corresponding to the sound waves accompanying the individual images of the picture strip.

From what is stated above it will be apparent that true talking films may only be taken where the events recorded on the picture strip occur simultaneously with the sounds to be recorded on the sound strip. In certain cases it may, however, also be desirable to produce combined films, the picture and sound strips of which correspond to each other, without their being recorded at the same time, as for example in cases where it is impossible to actually produce the desired sounds in connection or simultaneously with the events to be recorded on the picture strip, or vice versa. This may be the case when making the so-called trick films which it is desired to reproduce together with a corresponding sound film. Such films are generally not taken with the same speed as films showing natural movements, but in most cases each single film picture is individually photographed, whereupon the object to be photographed is varied as required for use in the subsequent individual picture etc. The series of individual pictures taken in this manner shown, when reproduced continuously and at the normal speed, the various artificial movements as if they were natural, as is well known. In the case of a sound film however, it is always necessary to record the same at its normal speed, that is the same speed at which it is to be reproduced, as the recording of a sound film must be continuous and even, if customary sounds, as talking, music or various natural sounds, noises and the like are to be reproduced in a natural manner and with their true frequencies.

The present invention has for its object to provide a method by which the above mentioned double strip is produced in cases where the movements and the sounds do not emanate from a common source. The principal characteristic of the novel method is that either for the entire double strip or for individual periods thereof a basic film is used, which may be either the picture or the sound film, and an accompanying film is produced, either a sound film or a picture film, as the case may be, the accompanying film being produced by what may be termed a reading or construction of the basic film, but otherwise independent thereof, the accompanying film corresponding to the basic film. This method may be used when making films of fables or fairy tales, wherein such objects as furniture, dolls and the like are represented as animate and articulate beings. It may also be used by one who owns either picture or sound strips and wants to make sound or picture strips corresponding thereto.

In practice the method may be performed in the following manner: If a film for reproducing talking and sounds, as for example, Andersen's "The Tramps", is to be made, a sound strip is first recorded, the words and sounds of which are to reproduce the fairy tale. This sound strip is considered wholly or essentially as a basic film and recorded, as stated above, first as a recital and then according to this invention a picture strip corresponding to the said basic film is made in a constructional way, in which picture film the objects move in accordance with the sounds and words of the basic film. To make the picture film which is complemental to the sound strip, picture strips or rather sections of the picture strip are made showing the several objects, as for example, a collar, in motion as if speaking. This recording is effected according to the beforementioned recording method for trick films, the individual pictures of the picture film being, however, taken with reference to a reading of the basic film, in this case of the sound strip, so that the movements correspond to the sound recorded on the basic film. This causes no special difficulties, as some practice will enable everyone to find by eye measure—or on the basis of playing off and measuring the basic film—the length of the section of the sound strip corresponding to a single uttered word, syllable or sound, or movement of the object representing it, or the drawn picture—in the case supposed above, the opening of the collar and its return to initial position.

The invention is illustrated in the accompanying drawing, containing a single perspective view showing diagrammatically and by way of example a constructional form of the arrangements by which both the "reading" of a previously recorded sound film and the production of the corresponding section of a picture film may be simplified. On the picture film are to be recorded as many individual pictures of the object of a certain event to be shown in motion or at rest in the picture film, as the number of individual pictures of this part of the event in the respective section of the picture film correspond to the respective part of a certain sound film. Whether the entire length of the sound film is equal to or differs from the entire length of the picture film, the individual sections of both films must, of course, be matched to each other in the correct proportion.

The arrangements shown in the drawing comprise a device for taking the picture film, and a device by which the previously recorded sound film may be fed under an optic observation panel so that its travel will be properly proportioned to that of the picture film. The observation panel is shown in combination with a duplex finder showing within a common frame what is seen in the visual field of the photographic camera as well as an enlarged image of the observation panel, under which the sound film is fed. Furthermore within the frame of the finder a number or some other distinguishing mark may be shown corresponding either to the length of the sound film which has passed in front of the observation panel or to consecutive numbers on the individual pictures of the picture film, or if desired to a combination thereof.

Referring to the drawing, 1 is the cinematographic recording camera placed vertically above a table 2, on which the objects to be photographed lie, in the case of Andersen's known fairy tale a collar 3 and a pair of scissors 4. The camera 1 carries a screen 5 enclosing the lens arrangement 6 and the electric lamps 7 illuminating the table 2. The picture film 8 is located inside the camera 1 and is moved in the direction of the arrow by a shaft 9 rotated from a vertical shaft 10 by a set of bevel gears. The shaft 10 is rotated by a set of bevel gears from a shaft 11 carrying a crank handle 12 or its equivalent. The shaft 11 carries a gear wheel 13, so dimensioned that it may be employed in combination with a gear wheel 14 to feed the sound film past the observation panel at a suitable slow speed corresponding to the advance of the picture film. The gear wheel 14 is mounted on a shaft 15 driving through a disengageable clutch 16 the shaft 17, by the rotation of which the sound film 18 is fed through an observation panel 19. The gear 13, 14 is so dimensioned, as above stated, that both the picture film 8 and the sound film 18 are slowly fed at the proper and corresponding speeds, when the crank handle 12 is rotated.

In order to enable suitable sections of the sound film 18 to be read or listened to as desired and independently of the feeding of the picture film, there are first the above mentioned clutch 16, by which the sound film may be disengaged from its mechanical connection with the manual driving gear of the picture film, and secondly a special mechanical driving mechanism, by which the sound film 18 may be fed at the necessary rather high speed past a reproducing apparatus. This special driving mechanism is diagrammatically shown in the drawing and may comprise a clockwork having a spring 20, which moves a gear wheel 21 driving, through a gear wheel 22, the shaft 17, by the rotation of which the sound film 18 is fed in the direction of the arrow. The sound film moved by the driving mechanism 20, 21, 22 is rendered audible by a suitable known reproducing device 23 diagrammatically indicated in the drawing, the sound film 18 being transluminated during its feeding by light directed towards a photo-electric cell, the variations of current of which are led through an amplifier to a telephone, a loud-speaker or the like.

During its recording the sound film 18 may have been provided along the edge which is foremost in the drawing, with numerals or other marks serving to indicate how long a section of the sound film has passed the observation panel 19 which is normally illuminated from below. Instead of numerals or marks along the edge of the sound film proper a stationary counting device may be placed immediately at the edge of the sound film and driven from the shaft 17. The window of such a counting device is indicated in the drawing by 24.

In order to facilitate the comparing of corresponding sections of the picture film 8 and the sound film 18 and, if desired, also the corresponding number in the window 24 of the counting device, the combined finder may be employed, the upper part of which leads to the camera 1, while its lower part is arranged immediately above the observation panel through which the sound film is fed and wherein the window of the counting device may lie. The said finder, which is shown greatly enlarged in the drawing, has a common picture surface or frame 25, which may normally be observed through a window excluding irrelevant light, and within which common frame 25 the finder reproduces simultaneously both what is seen in the field of vision of the camera and an image of the corresponding section of the sound film. The numeral at the edge of the sound film or the numeral of the counting device 24 also appears at the same time within the frame 25. A counting device 33 may, furthermore, be provided in combination with the feed mechanism of the picture film. As before stated, the numerals of both numbering systems may state the number of the picture of the picture film which is being recorded and to which a certain place of the sound film corresponds.

The proper finder consists in the form shown in the drawing of an upper part 26 extending from a mirror or prism device 36 or other suitable optical device in the camera 1. A reduced image of what is seen in the field of the camera is projected by the device 36 from the interior of the camera through the horizontal part 26. As indicated by the arrow 28, a mirror 27 reflects the light beams, which are again reflected by an inclined mirror 29 or other suitable optical device so as to make the objects on table 2 visible in the upper portion of the observation panel in the frame 25 of the finder. In the drawing a reduced reproduction of the collar 3 and scissors 4 is shown within the upper half of the frame 25.

The lower part of the finder consists of an arrangement of magnifying glasses or lenses 30 or other suitable optical arrangement serving to render visible and, if desired, to enlarge what appears in the observation panel 19. In the present case the device 30 projects the image of the observation panel 19 to an inclined mirror 31 reflecting the light beams to the glass plate of the frame 25, so that the lower half of the frame 25 shows an enlarged image 32 of that part of the sound film 18 which is within the observation panel and, furthermore, an image of the numeral at the edge of the sound film or in the window of the counting device, as indicated by the numeral 9125 almost at the centre of the frame 25.

When it is desired to hear the sound film continuously it is driven at the normal reproduction speed (which is equal to the recording speed) by a mechanical driving mechanism, as indicated by the spring 20. During this feeding the motion of the sound film is too fast to allow the sound film to be read by means of the image in frame 25. The lens device 30 is, therefore, so arranged as to be swung aside e. g., so that the photo-electric cell, which is employed—as stated above—to listen to the sound film during its rapid reproduction, may replace it. The device may also be so arranged that the disengaging of the coupling 16 replaces automatically the lens 30 by the said photo-electric cell.

The entire apparatus is operated as follows: The sound film 18 is studied and read by disengaging the clutch 16 and interposing the photo-electric cell so that the sound film is driven from the spring 20 and audibly reproduced by the reproducing device 23. During a series of reproductions of the sound film the main features of the appearance of the sound film and its most characteristic points or sounds are noted together with the numerals of the counting device corresponding to the interval containing these sounds. After this first and provisional study of the sound film by the photo-electric cell the sound film is submitted to a subsequent and thorough study by means of a series of reproductions thereof under the lens device 30, the sound film being driven from the crank handle 12 and observed in frame 25. When the sound film has been read in this manner, and its contents have been noted point for point or sound for sound, as for example on a sheet of paper or the like, the recording of the individual pictures of the proper picture film is proceeded to, the sound film being again returned to its initial position relative to the lens 30 and being thereafter advanced by means of the clutch 16, whereby it is mechanically engaged to the picture film 8, with which it is, therefore, moved synchronously. When the handle 12 is then rotated, an enlarged image of the sound film will be moved very slowly through the frame 25, thus enabling the objects 3, 4 on table 2 to be moved thereon in a manner corresponding to the indications or sounds of the sound film and to record picture for picture on the picture film by rotating the handle 12, so as to record the exact positions of the objects 3, 4 which are to correspond to the indications or sounds of the sound film 18, each total rotation of the handle corresponding to the record of one picture on the picture film 8, or rather causing this picture to be recorded. As the gears 13, 14 are so dimensioned as to feed the sound film 18 at the correct speed relative to the feeding of the picture film 8, the number of individual pictures recorded on the picture film will be automatically gauged in the correct manner relative to the corresponding section of the sound film.

In a similar manner in caricaturing drawing a musician may be represented as playing on a drawn violin or a drawn piano, a sound film with the tones of the instrument in question being first made after nature as a basic film, whereafter a trick film is made as an accompanying film exactly corresponding to the said sound film and in which the drawn musician passes a drawn bow over a drawn violin or strikes the keys of a likewise drawn piano. This is performed in the same way as specified above by reading or measuring out the sound strip so that the movements of the accompanying film during the reproduction last just as long as the sound lasts in the basic film and is synchronous with the same, so as to make the impression that the sounds are caused by the movements recorded.

The sound strip need not always be the basic strip since in some cases it will be advantageous to suit it to the picture strip. This may be so in the case of a continuous monotonous sound, such as a constant tone or a natural sound as the rushing noise of a storm or of the sea or sounds not caused by the photographed objects or persons. In these cases it will generally be easier to read the length of the period on the picture strip and to produce a section of sound strip corresponding thereto.

The present method of making in a constructional way the so-called sound or talking films is intended especially for use in the recording of films, in cases where difficulties are encountered in recording the picture and sound strips in the customary simultaneous manner, or by which it is advantageous not to make the records at the same time. This may be preferred in a plurality of various film records, especially trick films and the like. Among the special kinds of such films may be mentioned:

1. Filmatized fables and fairy tales.
2. Caricature films and other humorous records.
3. Advertising films.

By trick record a stove may be shown, which is being polished with a special kind of stove polish, and at the same time an advertising poem or the like is recited by movements of the stove door or ash pan, so that the impression is created that the stove speaks the words of the advertisement. In general all kinds of sound films may be thus combined with advertising films in various ways.

4. Instructive films, as e. g. reproduction of scientific experiences or films such as the Einstein film which is generally accompanied by a speech. According to the invention such a speech may form a sound strip and be combined with a picture strip. The invention is also well suited for a filmatic discussion of mathematical problems, which are then represented by lines, circles or other figures moving during the verbal explanation given by the sound film and carrying out the changes and manipulations which serve to show the mathematical problem. The same method may also be employed in instructive films in various other fields, as e. g. astronomy, zoology, geography, statistics, book keeping, languages, shorthand, art, history of art, theory of music, etc.

5. Nature films.

The method may also be used for a new kind of film art: the reproduction of fine pictures of nature with or without natural colors, with which an accompanying sound film is combined, e. g. recital of poems or music in order to characterize the photographs of nature in question.

The employment of the invention is not limited to the above cases, but may take place in every case where it might be of interest to bring a sound strip in accordance with a picture strip in a constructional way, or to make it accompany the same, or vice versa.

I claim:

Process for producing combined sound and motion pictures from an existing strip of photographic sound record and from objects the various forms and stages of movement of which are photographed to be reproduced in synchronism with predetermined portions of said sound strip, which process comprises normally and slowly reproducing said sound strip, studying and noting during said reproduction the nature and position of sound characters of the sound strip that represent recorded sounds corresponding to which pictures of said objects in various forms and positions are to be prepared, preparing information based on said study identifying the nature and location of said sound characters with which the various forms and positions of said objects are to be synchronized, discontinuously feeding said sound strip while simultaneously discontinuously feeding a photographic film through a photographic camera, giving the objects in proper sequence the forms and positions they must assume with respect to the different identified sound characters in accordance with said information and photographically recording picture by picture the objects in said different forms and positions whereby a picture record synchronized with said sound strip is produced.

EINAR DESSAU.